(12) United States Patent
Fujino

(10) Patent No.: US 6,822,708 B2
(45) Date of Patent: Nov. 23, 2004

(54) LIQUID CRYSTAL DISPLAY DEVICE

(75) Inventor: Masahiro Fujino, Kanagawa (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 09/951,681

(22) Filed: Sep. 13, 2001

(65) Prior Publication Data
US 2002/0047966 A1 Apr. 25, 2002

(30) Foreign Application Priority Data
Sep. 19, 2000 (JP) ..................................... P2000-284292

(51) Int. Cl.$^7$ ........................................... G02F 1/1335
(52) U.S. Cl. ..................... 349/113; 349/112; 349/110; 349/111; 349/118
(58) Field of Search ................................ 349/124, 113, 349/117, 118, 75, 186, 96, 109, 119

(56) References Cited
U.S. PATENT DOCUMENTS

| | | | | |
|---|---|---|---|---|
| 5,500,750 A | * | 3/1996 | Kanbe et al. | 349/42 |
| 5,680,185 A | * | 10/1997 | Kobayashi et al. | 349/88 |
| 6,011,605 A | * | 1/2000 | Mizuno et al. | 349/113 |
| 6,111,699 A | * | 8/2000 | Iwata et al. | 359/599 |
| 6,184,968 B1 | * | 2/2001 | Taylor-Smith | 349/158 |
| 6,226,064 B1 | * | 5/2001 | Shimada et al. | 349/117 |
| 6,239,856 B1 | * | 5/2001 | Imura et al. | 349/192 |
| 6,327,088 B1 | * | 12/2001 | Iwata et al. | 359/599 |
| 6,373,541 B1 | * | 4/2002 | Sekime et al. | 349/117 |

* cited by examiner

Primary Examiner—Minhloan Tran
Assistant Examiner—Fazli Erdem
(74) Attorney, Agent, or Firm—Sonnenschein, Nath & Rosenthal LLP

(57) ABSTRACT

In a liquid crystal display device having a reflection electrode of a reflection diffuser panel shape formed with surface roughness, a liquid crystal orientation film for realizing a predetermined pre-tilt angle is formed on the reflection electrode by an optical orientation, technique. A liquid crystal display device having a reflection electrode of a reflection diffuser panel shape formed with surface roughness provided on a driving substrate and an ultraviolet-reactive liquid crystal orientation film formed on the reflection electrode is produced by first step of forming a protective film made of a material transparent to a visible light for absorbing an ultraviolet light on the reflection electrode on the driving substrate side so as to eliminate the level difference in the surface roughness of the reflection electrode; a second step of coating a composition for an ultraviolet-reactive liquid crystal orientation film onto the protective film; and a third step of forming a liquid crystal orientation film on the coating film of the composition for a liquid crystal orientation film by irradiating a polarizing ultraviolet light L onto the substrate surface in the slanting direction.

14 Claims, 8 Drawing Sheets

22b

6

$$\begin{pmatrix} \text{---- 405G MANUFACTURED BY JSR, FILM THICKNESS} \\ \text{1.3 } \mu\text{m (FIRST LAYER AND SECOND LAYER)} \\ \text{------ 415G MANUFACTURED BY JSR, FILM THICKNESS} \\ \text{2.6 } \mu\text{m} \\ \text{........ 415G MANUFACTURED BY JSR, FILM THICKNESS} \\ \text{3.2 } \mu\text{m} \end{pmatrix}$$

LIQUID CRYSTAL DISPLAY DEVICE

RELATED APPLICATION DATA

The present application claims priority to Japanese Application(s) No(s). P2000-284292 filed Sep. 19, 2000, which application(s) is/are incorporated herein by reference to the extent permitted by law.

BACKGROUND OF THE INVENTION

1. Field of the Invention

The present invention relates to a liquid crystal display device provided with a reflection electrode of a reflection diffuser panel shape formed with surface roughness and more specifically to a technique for forming an ultraviolet-reactive liquid crystal orientation film on the reflection electrode.

2. Description of the Related Art

The driving side thin film transistor (TFT) substrate of an active matrix type liquid crystal display device has, in the reflection part of a pixel, a reflection electrode of a reflection diffuser panel shape formed with surface roughness and having, in the transmission part of the pixel, a transparent electrode consisting of a transparent conductive film, thereby performing semi-transmission liquid crystal display. The driving side TFT substrate has hitherto been produced as shown in FIGS. 12A to 12J. FIGS. 12A to 12J show the processes for producing a liquid crystal display device having a TFT of a bottom gate construction in a pixel structure. A liquid crystal display device having a TFT of a top gate construction in a pixel structure is basically produced by the same production process.

As shown in FIG. 12A, a metal film is deposited on a transparent substrate 1, and then, is dry etched using the photolithographic method to form a gate G and an auxiliary capacity electrode Cs. Thereafter, a gate insulating film 2 is laminated thereon to form a polysilicon film 3.

To prevent impurities doping to a channel part during impurities doping to a source region and a drain region, a stopper 4 is formed on the polysilicon film 3 as the channel part so as to be in a self-alignment manner to the gate G, thereby performing impurities doping to the source region and the drain region.

Thereafter, the polysilicon fun 3 is separated in an island form using a photoresist process and an etching process to form a low-temperature polysilicon TFT.

An interlayer insulating film 5 is formed (FIG. 12B) To form contact holes and an opening of the transmission part of a pixel, the photoresist layer 6 is formed on the interlayer insulating film 5. A mask with a pattern opening the contact hole forming parts the transmission part of the pixel as a photo mask is used to pattern the photoresist layer 6 by the photolithographic method (FIG. 12C). Using this as an etching mask, the interlayer insulating film 5 is etched to form contact holes $H_1$ and an opening of a transmission part T of the pixel in the interlayer insulating film 5 (FIG. 12D).

A metal film is deposited by sputtering, and then, is etched to form a source electrode $S_1$ and a signal wiring connected through the contact hole $H_1$ to the source S of a TFT and a drain electrode $D_1$ connected through the contact hole $H_1$ to the drain D of the TFT (FIG. 12E)

A rough shape as the underlayer of the surface roughness shape of a reflection electrode having reflection diffusion ability is formed as follows, using two layers made of a photoresist material. A first layer 7 forming a basic rough construction is formed using a photoresist material by the photolithographic method (FIG. 12F). There is used a photo mask opening a second contact hole $H_2$ to be conductive with the source electrode $S_1$ or the drain electrode $D_1$ and the transmission part T of the pixel. A second layer 8 for improving the reflection properties is formed using a photoresist material similar to that of the first layer 7 by the photolithographic method (FIG. 12F). There is used a mask, as in the first layer 7, opening a third contact hole $H_3$ to be conductive with the drain electrode $D_1$ and the transmission part T of the pixel. A surface roughness shape consisting of two layers of the first layer 7 and the second layer 8 is thus formed.

A transparent conductive film 9 forming a transparent electrode of the transmission part T of the pixel is deposited using a sputtering method. The transparent conductive film 9 connected to the drain electrode $D_1$ by the contact hole $H_3$ (FIG. 12H). As shown in FIG. 12H, the transparent conductive film 9 is formed in the reflection part of the pixel and may be used as the underlayer of the reflection electrode.

A metal film such as Al or Ag having a high reflectivity is deposited in a reflection part R of the pixel to form a reflection electrode 10 using the photolithographic method (FIG. 12I).

A liquid crystal orientation film 30 is coated onto the entire surface of the substrate to perform an orientation process by a mechanical rubbing method (FIG. 12J). A TFT substrate having the orientation film 30 is thus completed.

A liquid crystal orientation film is also coated onto an opposing substrate formed with a color filter and an opposing transparent electrode to perform the orientation process. Thereafter, in order that both substrates hold a suitable gap, a gap material is used to superpose both substrates together by a sealing material. Liquid crystals are then implanted in the resulting substrates for sealing to provide a liquid crystal display panel.

In the prior art method for producing the driving side TFT substrate of the active matrix type semi-transmission liquid crystal display device shown in FIGS. 12A to 12J, since the orientation process is performed by the mechanical rubbing method, dust is caused during rubbing. This results in contamination of the substrate and defects due to a short circuit of the pixel electrode and the opposing electrode. Static damage due to friction is also caused. The producing yield will be lowered.

To overcome such problems, in place of the mechanical rubbing method, there is proposed an optical orientation technique in which an organic film for a liquid crystal orientation film is coated onto a substrate which is then irradiated with a polarizing ultraviolet light, so that a chemical change corresponding to the polarizing direction of the ultraviolet light is caused in the organic film to live the orientation properties and a pre-tilt angle to a liquid crystal.

As shown in FIG. 13, using the prior art optical orientation technique, a coating film 31 made of a composition for a liquid crystal orientation film is formed on the reflection electrode 10 of a reflection diffuser panel shape formed with surface roughness, and then, is radiated with a polarizing ultraviolet light $L_0$. Incident angles $\alpha_1$ and $\alpha_2$ of the polarizing ultraviolet light $L_0$ to the coating film 31 are not constant depending on a position on the surface roughness. A predetermined pre-tilt angle cannot be obtained. The polarizing ultraviolet light $L_0$ passing through the coating film 31 made of a composition for a liquid crystal polarization film is reflected by the reflection electrode 10. A reflection light $L_1$ thereof is irradiated again onto the coating film 31 (a re-irradiation phenomenon). A predetermined orientation process cannot be performed. The display quality is lowered significantly.

The liquid crystal orientation film is formed on the reflection electrode of a reflection diffuser panel shape formed with surface roughness. Similar problems are caused not only in the semi-transmission liquid crystal display device having in one pixel a reflection part formed with a reflection electrode and a transmission part made of a transparent conductive film, but also in a reflection type liquid crystal display device having a pixel electrode consisting only of a reflection electrode. They are also caused not only in the active matrix type liquid crystal display device but also in a passive type liquid crystal display device.

SUMMARY OF THE INVENTION

Accordingly, an object of the present invention is to provide a liquid crystal display device having a reflection electrode of a reflection diffuser panel shape formed with surface roughness in which when a liquid crystal orientation film is formed on the reflection electrode by an optical orientation technique without being affected by the surface roughness of the reflection electrode and a re-irradiation phenomenon from the reflection electrode, so as to realize a predetermined pre-tilt angle in the liquid crystal, thereby forming an image excellent in the display quality.

The present inventors have found the following facts. In a liquid crystal display device having a reflection electrode of a reflection diffuser panel shape formed with surface roughness, a protective film for eliminating the level difference in the surface roughness of a reflection electrode is formed on the reflection electrode by a material transparent to a visible light for absorbing an ultraviolet light, a coating film made of a composition for an ultraviolet-reactive liquid crystal orientation film is formed on the protective film, and a coating film is irradiated with a polarizing ultraviolet light to form a liquid crystal orientation film. The coating film made of a composition for a liquid crystal orientation film is formed flatly on the protective film. The incident angles of the polarizing ultraviolet light incident upon the coating film made of a composition for a liquid crystal orientation film are constant in any position of the coating film. The light passing through the coating film is reflected by the reflection electrode and is again incident upon the coating film. The intensity of the light is lowered significantly by the protective film between the coating film and the reflection electrode. The influence of the reflection light from the reflection electrode onto the orientation process of the coating film can be reduced greatly. The liquid crystal orientation film is thus formed to produce a high-quality liquid crystal display device, though the liquid crystal orientation film is formed on the reflection electrode by the optical orientation technique.

The present invention provides a method for producing a liquid crystal display device having a reflection electrode of a reflection diffuser panel shape formed with surface roughness provided on a driving substrate and an ultraviolet-reactive liquid crystal orientation film formed on the reflection electrode, comprising the following 3 steps:

(1) forming a protective film made of a material transparent to a visible light for absorbing an ultraviolet light on the reflection electrode on the driving substrate side so as to eliminate the level difference in the surface roughness of the reflection electrode;

(2) coating a composition for an ultraviolet-reactive liquid crystal orientation film onto the protective film; and (3) forming a liquid crystal orientation film on the coating film of the composition for a liquid crystal orientation film by irradiating a polarizing ultraviolet light onto the substrate surface in the slanting direction.

In addition, the present invention provides a liquid crystal display device having a reflection electrode of a reflection diffuser panel shape formed with surface roughness provided on a driving substrate and an ultraviolet-reactive liquid crystal orientation film formed on the reflection electrode, wherein a protective film made of a material transparent to a visible light for absorbing an ultraviolet light is formed so as to eliminate the level difference in the surface roughness of the reflection electrode, and an ultraviolet-reactive liquid crystal orientation film is formed on the protective film.

According to the present invention, the liquid crystal display device is provided with the ultraviolet-reactive liquid crystal orientation film. Unlike the case that the liquid crystal orientation film is provided by the mechanical rubbing method, there are eliminated contamination and defects due to dust and static damage due to friction so as to improve the yield.

The protective film flattens the surface roughness of the reflection electrode. The protective film prevents the re-irradiation phenomenon due to the reflection light from the reflection electrode. Though the liquid crystal orientation film is formed on the reflection electrode by the optical orientation technique, a predetermined pre-tilt angle can be realized in the liquid crystal to form an image excellent in the display quality.

DESCRIPTION OF THE PREFERRED EMBODIMENTS

Figure 1A:
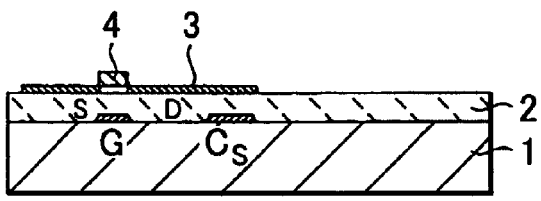
FIGS. 1A to 1I are process explanatory views of a method for producing a liquid crystal display device according to the present invention.

The present invention will be described hereinbelow in detail with reference to the drawings. In the respective drawings, similar reference numerals denote the same or equivalent components.

FIGS. 1A to 1I are process explanatory views of one embodiment of the present invention for producing a semi-transmission liquid crystal display device having a pixel structure of a TFT of a bottom gate construction. The methods of FIGS. 1A to 1I are largely different from prior art methods shown in FIGS. 12A to 12J in that a specific protective film 12 is formed on a reflection electrode 10 and an ultraviolet-reactive liquid crystal orientation film 32 is formed thereon. Further, the reflection electrode 10 is formed by steps (A) to (E) described below in detail. An insulating layer under the reflection electrode 10 is formed of a single layer construction (an interlayer insulating film 5) from a three-layer lamination construction shown in FIG. 12 (the interlayer insulating film 5 and the first layer 7 and the second layer 8 made of a photoresist material). The reflection electrode 10, a source electrode $S_1$, and a drain electrode $D_1$ are formed at the same time. The production process of the TFT substrate is simplified significantly to improve the productivity.

In this method, as show in FIG. 1A. a single layer film or a lamination film comprising materials such as Mo, Cr, Al, Ta, and/or W, is first deposited on a transparent substrate 1, and is then dry etched using a photolithographic method to form a gate G and an auxiliary capacity electrode Cs. A silicon nitride film, a silicon oxide film, or a lamination film is formed as a gate insulating film by a sputtering method or a CVD method. A polysilicon film 3 is formed thereon. In a method for forming the polysilicon film 3, for example, a semiconductor layer is formed on the gate insulating film 2, a dehydrogenation process at high temperature is performed in order to lower the hydrogen concentration of the semiconductor layer, and crystallization is performed by excimer laser to convert the semiconductor layer to a polysilicon film. When the hydrogen concentration is below 1 atom %, the dehydrogenation process may be omitted. To stabilize the film quality, the gate insulating film and the semiconductor layer are preferably deposited continuously.

To prevent doping to a channel part during the impurities doping to the source region and the drain region, a stopper 4 is formed on the polysilicon film 3 as the channel part so as to be in a self-alignment manner to the gate G. The stopper 4 is formed as follows. A stopper film made of silicon oxide is deposited on the gate insulating film 2. A resist is coated thereon. The back surface of the resist layer is exposed using the gate G as a mask. The resist is patterned in the channel forming portion so as to be in a self-alignment manner to the gate G. The stopper film is etched using the resist as a mask.

Thereafter, impurities are doped in the source region and the drain region using an ion implantation method or an ion doping method to form a source S and a drain D. The polysilicon film is separated in an island form using a photoresist process and an etching process to form a TFT. The above-mentioned TFT forming method is a method for forming a low-temperature polysilicon thin film transistor. The producing method of the present invention can be applied likewise when an amorphous silicon thin fun transistor is formed.

As a process for forming the reflection electrode 10, the following steps, (A) to (E), are performed.

Figure 1B:
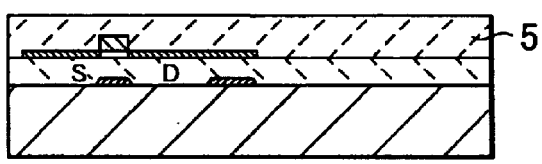

In step (A), an interlayer insulating film 5 made of an inorganic insulating substance such as a silicon nitride film, a silicon oxide film, or a lamination film is formed by the CVD method or the sputtering method (FIG. 1B).

In step (B) a photoresist layer 6 is formed on the interlayer insulating film 5.

Figure 1C:
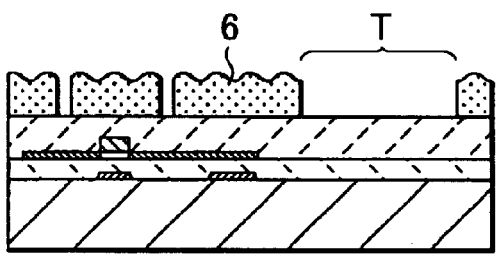

In step (C), the photoresist layer 6 is patterned by the photolithographic method (FIG. 1C). In this case, a mask in which a pattern below the resolution limitation of the stepper is formed in the forming part of the reflection electrode is used as the photo mask of the photoresist layer 6. Thus, the photoresist layer 6 corresponding to the forming part of a contact hole H1 formed on the source S or the drain D in the interlayer insulating film 5 and a transmission part T of a pixel can be removed completely. The photoresist layer 6 corresponding to the forming pail of the reflection electrode can be also formed with surface roughness.

Figure 5:
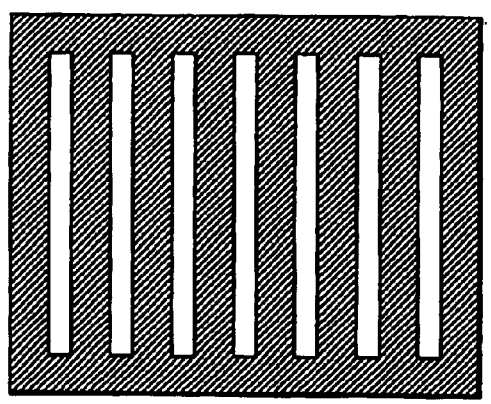
FIG. 5 is a plan view of a photo mask having an L/S pattern.
Figure 6:
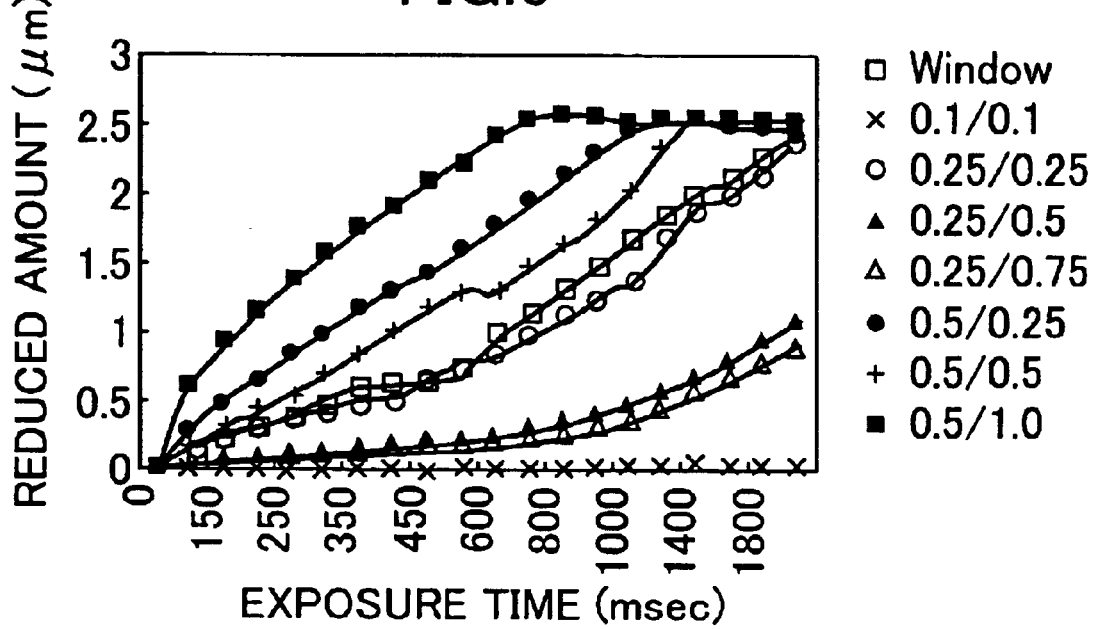
FIG. 6 is a diagram showing the relation between L/S of a photo mask, exposure time, and the reduced amount of the film thickness of a photoresist layer in a photolithographic process of the photoresist layer.

A more specific shape of the photo mask can be determined by experimentally obtaining the relation between a pattern of the photo mask, the reduced amount of the film thickness of the photoresist layer and exposure time. For example, when a pattern of line/space (hereinafter, called L/S) as shown in FIG. 5 is exposed in the stepper, the relation between the reduced amount of the film thickness of the photoresist layer and exposure time is changed in accordance with L/S, as shown in FIG. 6. In FIG. 6, the window outside the graph indicates that S is above the resolution of the exposing device. The numerical values at the right side of the symbols such as X indicate L ($\mu$m)/S ($\mu$m). As will be appreciated from FIG. 6, when an exposure for completely opening the forming part of the contact hole of the photoresist layer is 1200 msec L is 0.25 $\mu$m, and S is 0.50 $\mu$m the reduced amount of the film thickness of the photoresist layer is about 0.6 $\mu$m. $\mu$m are selected, the reduced amount of the film thickness of the photoresist layer can be found to be 0.6 $\mu$m.

Figure 7:
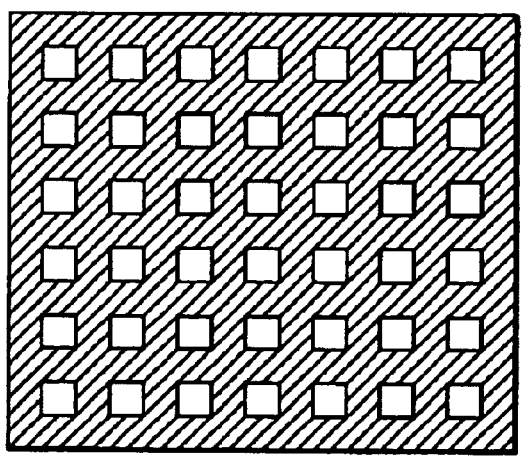
FIG. 7 is a plan view of a photo mask having a dot pattern.

When the reduced amount of the film thickness of the photoresist layer is thus determined experimentally, the dot pattern as shown in FIG. 7 may be used in place of the L/S pattern of FIG. 5.

Another more specific shape of the photo mask can be calculated from a constant of the optic system. The effective transmissivity of the photo mask can control the film thickness of the photoresist layer.

Figure 8:
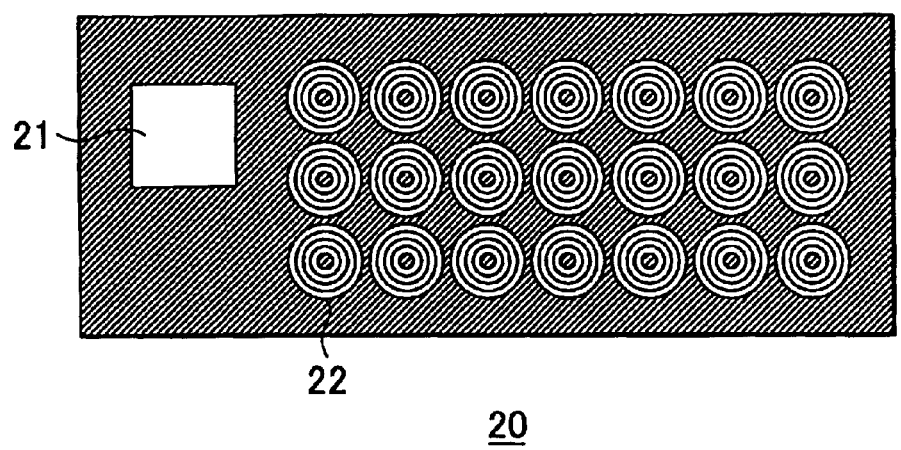
FIG. 8 is a plan view of a photo mask for use in a photoresist layer.
Figure 9A:
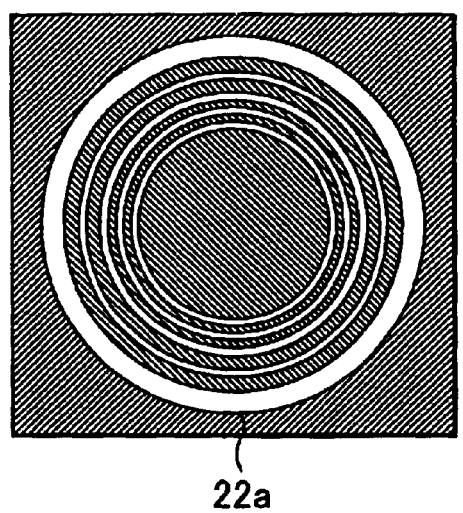
FIG. 9A is a plan view of the pattern of a photo mask forming surface roughness in a photoresist layer.
Figure 9B:
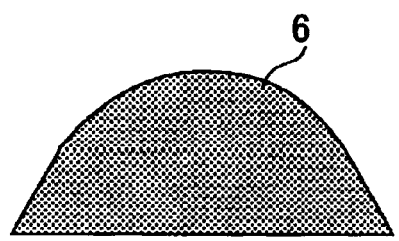
FIG. 9B is a side view of surface roughness of a photoresist layer formed using the mask of FIG. 9A.

As the actual pattern of the photo mask, a pattern unresolved by the stepper is provided stepwise or continuously. For example, as shown in a photo mask 20 of FIG. 8, when forming a portion 21 for completely opening the photoresist layer by exposure and a portion for forming surface roughness in the photoresist layer, individual pattern portions 22 for forming the surface roughness can be a plurality of fine ring patterns in a concentric form unresolved by the stepper such as pattern 22a shown in FIG. 9A. Such a photo mask is used to expose and develop the photoresist layer. A portion completely opened and a portion formed with the surface roughness can be produced in the photoresist layer. After development, it is heated and reflowed. As shown in FIG. 9B, the shape of the individual patterns for forming the surface roughness of the photoresist layer 6 can be smooth.

Figure 10A:
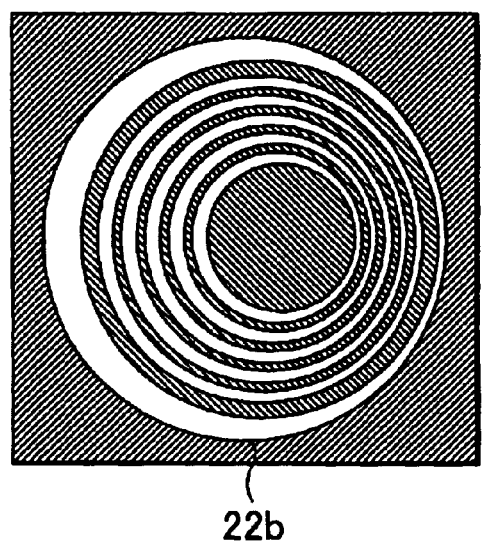
FIG. 10A is a plan view of the pattern of a photo mask forming surface roughness in a photoresist layer.
Figure 10B:
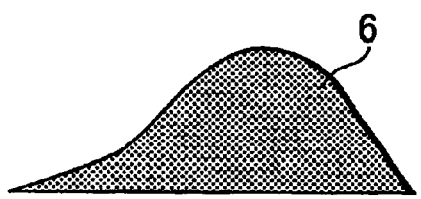
FIG. 10B is a side view of surface roughness of a photoresist layer formed using the mask of FIG. 10A.

The pattern of the photo mask may be a specific pattern corresponding to the shape of surface roughness for increasing the reflectivity of the reflection electrode in the specific direction so as to be formed in the interlayer insulating film 5. For example, as shown in FIG. 10A, a plurality of ring patterns are eccentric. The photo mask is used to expose and develop the photoresist layer 6, which is then re-flowed as needed. As shown in FIG. 10B, in the shape of the individual patterns for forming the surface roughness of the photoresist layer 6, the slope of one of the side surfaces can be steep, and the slope of the other side surface can be gentle.

Figure 11:
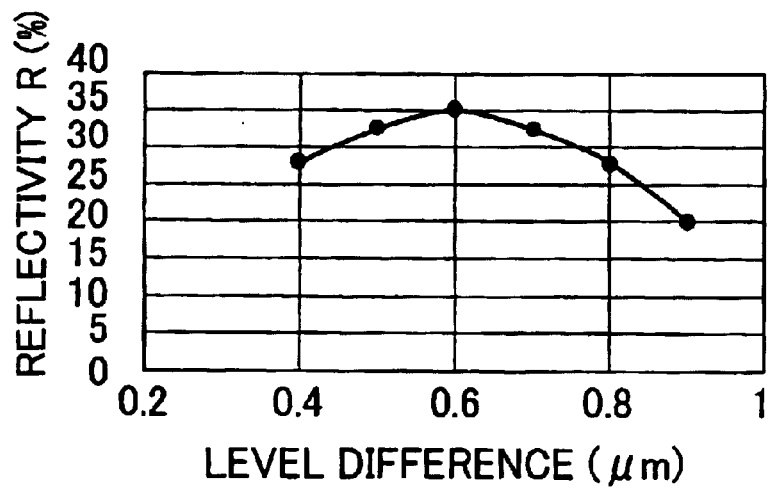
FIG. 11 is a diagram showing the relation between the level difference and reflectivity of surface roughness of a reflection electrode.

The reflectivity of the reflection electrode depends on the level difference in the pattern formed in the photoresist layer 6, as shown in FIG. 11. The level difference in the pattern depends on the pattern shape of the photo mask and an exposure. The pattern of the photo mask and an exposure of the photoresist layer 6 are set suitably so that the reflection electrode is formed into the level difference to provide a predetermined reflectivity.

Using the photoresist layer 6 thus patterned as an etching mask, the interlayer insulating film 5 is dry etched. The shape of the photoresist layer 6 is transferred onto the interlayer insulating film 5. The following step (D) is then performed.

Figure 1D:
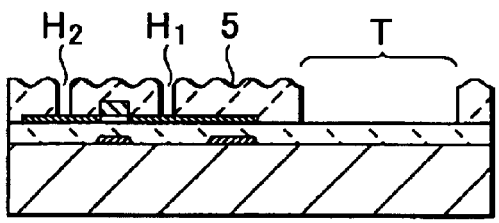

In step (D), using the photoresist layer 6 patterned in step (C) as an etching mask, the interlayer insulating film 5 is etched by a dry etching method or a resist recessing method such as an RIE method or an ICP method (FIG. 1D). Thus, the interlayer insulating film of the forming part of the contact boles H1 and the transmission part of the pixel is opened completely. In addition, surface roughness is formed in the interlayer insulating film of the forming part of the reflection electrode.

After the interlayer insulating film 5 is formed in step (D), an insulating film does not need to be laminated in order to form the surface roughness shape of the reflection electrode 10, In the following step, step (E), the reflection electrode 10 is formed.

Figure 1E:
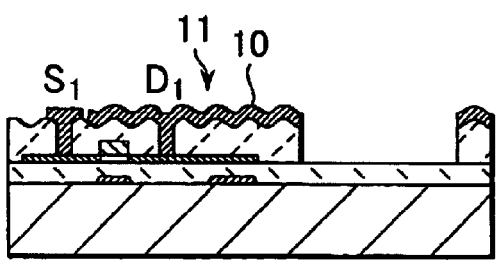

In step (E), a metal having a high reflectivity such as Al, Ag, Al alloy or Ag alloy is deposited using a sputtering method to form a metal film 11. The metal film 11 is then patterned by the photolithographic method and is etched. A source electrode S1 and a signal wiring conductive with the source S through the contact hole H1 and a drain electrode D1 and the reflection electrode 10 conductive with the drain D through the contact bole H1 are formed at the same time (FIG. 1E). In this case, the metal film 11 may be of a multi-layered construction having a conductive film having a high reflectivity such as Al, Ag, Al alloy or Ag alloy and a metal film comprising materials such as Cr, Mo, Ti and/or W.

After the reflection electrode 10 is formed, using the following steps, (1) to (3), a liquid crystal display device in which an ultraviolet-reactive liquid crystal orientation film is formed on the reflection electrode 10 is produced as follows.

Figure 14:
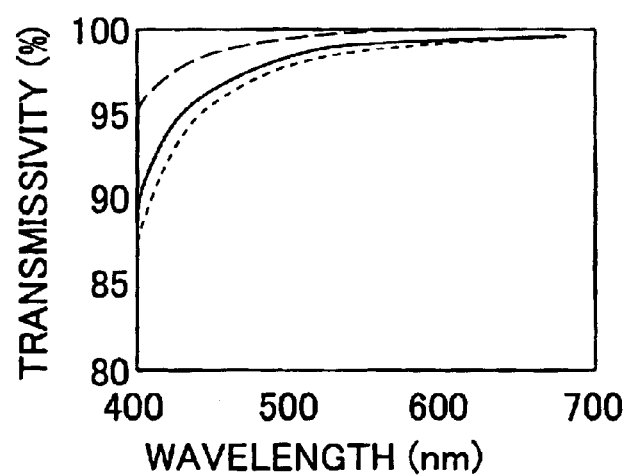
FIG. 14 is transmissivity characteristic diagram of a photoresist material forming a protective film.

In step (1), a protective film 12 is formed on the reflection electrode 10 so as to eliminate the level difference in the surface roughness of the reflection electrode 10. The protective film 12 is formed by a material transparent to a visible light for absorbing an ultraviolet light. As the specific forming material for the protective film 12, it is possible to use, for example, an organic photoresist material such as 405G, 415G, or 420G, which are manufactured by JSR. FIG. 14 shows the transmission properties of the photoresist materials.

Figure 1F:
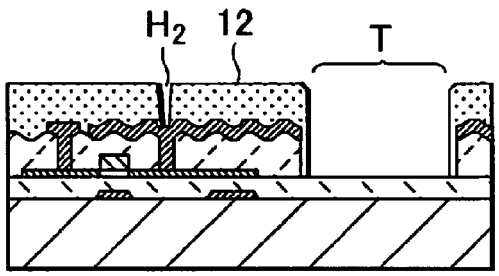

In the protective film 12, a contact hole $H_2$ corresponding to the forming part of the drain electrode $D_1$ and an opening corresponding to the transmission part T of the pixel are patterned by the photolithographic method (FIG. 1F).

The thickness of the protective film 12 is preferably set so that the cell gap of the liquid crystal display cell is ½λ in the transmission part of the pixel and is ¼λ in the reflection part. The cell gap of such a liquid crystal display cell is generally required to brighten the screen. In the present invention, the thickness of the protective film 12 is adjusted so as to easily form such a cell gap.

Figure 1G:
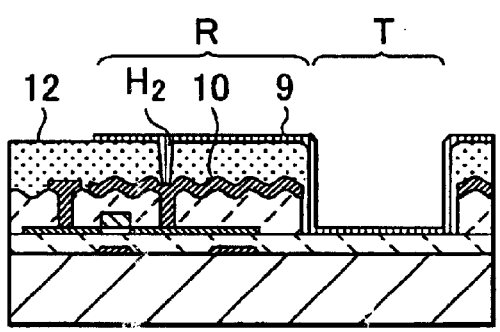

In the present invention, after the protective film 12 is formed in step (1), a composition for an ultraviolet-reactive liquid crystal orientation film is coated onto the protective film 12 in the step (2). Preferably, before a composition for an ultraviolet-reactive liquid crystal orientation film is coated in step (2), as shown in FIG. 1G, a transparent conductive film 9 is formed on the protective film 12 so as to be a pattern including the transmission part T of the pixel and the reflection part R of the pixel. A transparent electrode of the transmission part T of the pixel is formed. The transparent conductive film 9 covers the reflection electrode 10. The transparent conductive film 9 is connected electrically to the reflection electrode 10 through the contact hole H2 so as to be conductive. The pattern of the transparent conductive film 9 may be formed only in the transmission part of the pixel or the contact part of the transmission part and the reflection part of the pixel. As described above, the transparent conductive film 9 is formed to cover the reflection electrode 10, thereby electrically connecting the transparent conductive film 9 to the reflection electrode 10 so as to be conductive. The liquid crystal display cell can prevent a printing phenomenon in which the material, such as Ag, forming the reflection electrode 10 is transferred onto the opposing substrate.

The transparent conductive film 9 is formed so that an ITO is deposited by the sputtering method to be patterned by the photolithographic process and the etching process.

Figure 1H:
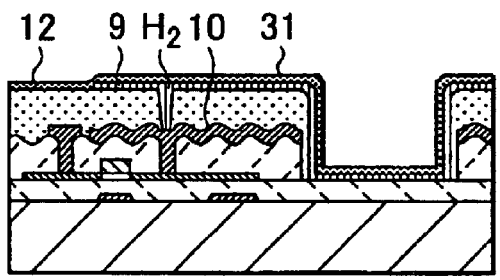

After the transparent conductive film 9 is formed, in step (2), a coating film 31 made of a composition for an ultraviolet-reactive liquid crystal orientation film is formed as shown in FIG. 1H.

As the composition for an ultraviolet-reactive liquid crystal orientation film, it is possible to use a polyamic acid polymer material as a polyimide type optical orientation material disclosed in U.S. Pat. No. 5,731,405. The thickness of the coating film 31 is generally 0.02 to 0.08 μm.

Figure 1I:
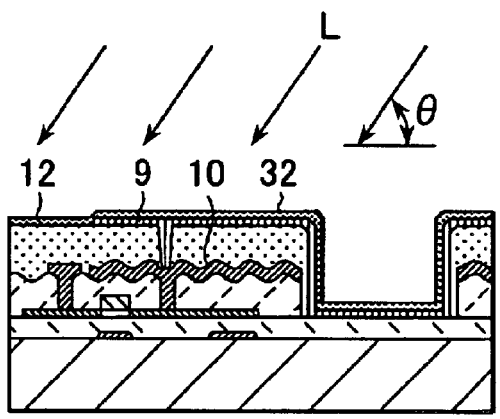

In step (3), the coating film 31 formed in step (2) is irradiated with a polarizing ultraviolet light L onto the substrate surface in the slanting direction to provide a TFT substrate formed with a liquid crystal orientation film 32 (FIG. 1I).

Irradiation of the polarizing ultraviolet light is preferably performed twice of a first irradiation for regulating the orientation direction of the liquid crystal and a second irradiation for exhibiting a pre-tilt angle.

An irradiation angle of the polarizing ultraviolet light L in the first irradiation, that is, an irradiation angle θ to the substrate surface is preferably $40° \leq \theta < 90°$ to prevent the contrast from being lowered. The second irradiation is preferably performed by rotating the substrate surface 45 to 90° to the first irradiation. An irradiation angle of the second irradiation is preferable so that the irradiation angle to the substrate surface is $40° \leq \theta < 90°$. Outside the range, the pre-tilt angle is small.

In the present invention, the coating film 31 made of a composition for an ultraviolet-reactive liquid crystal orientation film is formed on the reflection electrode 10. In spite of the fact, the coating film 31 is flattened by the protective film 12. The polarizing ultraviolet light L is irradiated at a fixed incident angle onto the coating film 31 made of a composition for an ultraviolet-reactive liquid crystal orientation film.

The polarizing ultraviolet light L passes through the coating film 31 and the protective film 12 and is then reflected by the reflection electrode 10. The polarizing ultraviolet light is absorbed into the protective film 12. The reflection light from the reflection electrode 10 does not include the polarizing ultraviolet light. The re-irradiation phenomenon in the coating film 31 can be prevented. According to the present invention, a stable liquid crystal orientation film 32 can be obtained.

The ultraviolet-reactive liquid crystal orientation film is also formed on the opposing substrate formed with the color filter and the opposing transparent electrode. In order that the TFT substrate formed with the above-mentioned liquid crystal orientation film 32 and the opposing substrate can hold a suitable gap, a gap material is used to superpose both substrates together by a sealing material. Liquid crystals are then implanted into the resulting substrates for sealing to provide a liquid crystal display device.

In the method for producing a liquid crystal display device for performing semi-transmission liquid crystal display, there is described above the case wherein the reflection electrode 10 is formed by steps (A) to (E), and the ultraviolet-reactive liquid crystal orientation film 32 is formed thereon by steps (1) to (3). The present invention can be also applied to the case wherein a reflection electrode is formed by the prior art shown in FIG. 12, and the ultraviolet-reactive liquid crystal orientation film is formed thereon.

Figure 2A:
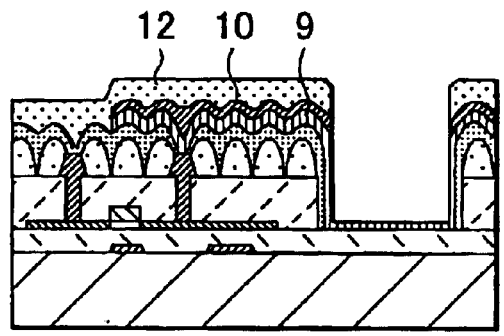
FIGS. 2A to 2C are process explanatory views of a method for producing a liquid crystal display device according to the present invention.
Figure 2B:
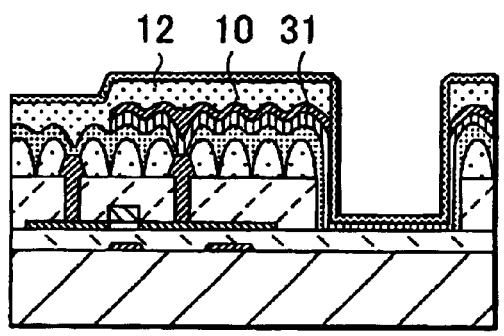
Figure 2C:
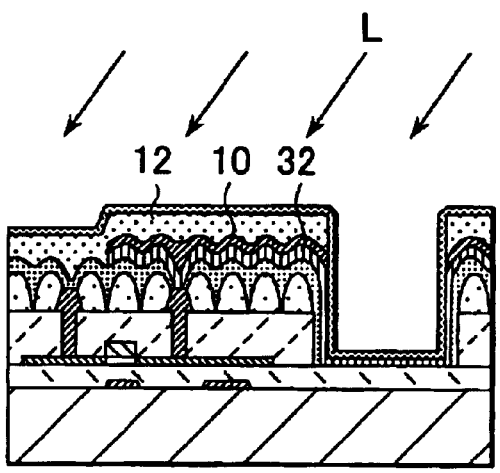
Figure 12A:
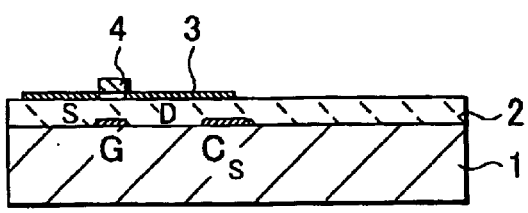
FIGS. 12A to 12J are production process views of a prior art active matrix type semi-transmission liquid crystal display device.
Figure 12B:
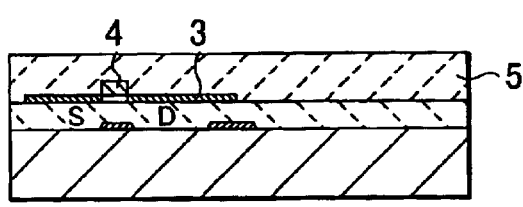
Figure 12C:
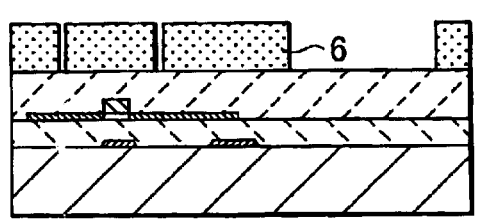
Figure 12D:
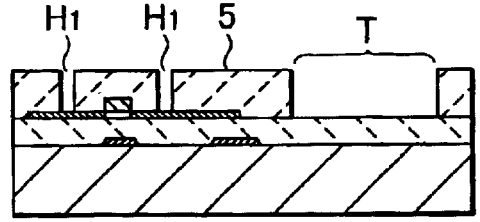
Figure 12E:
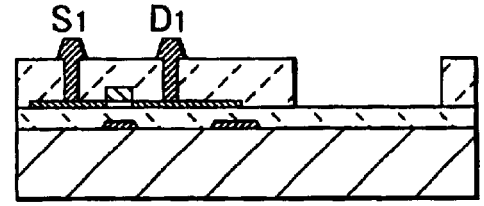
Figure 12F:
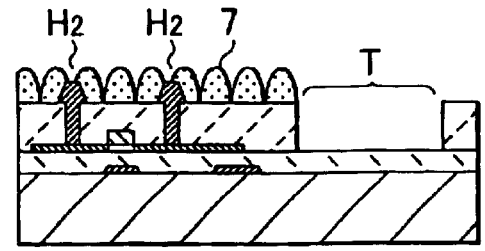
Figure 12G:
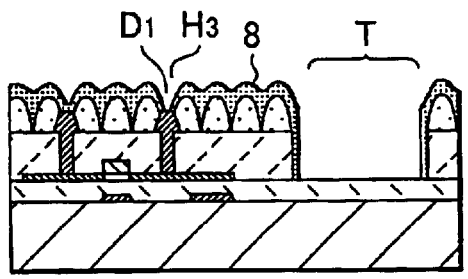
Figure 12H:
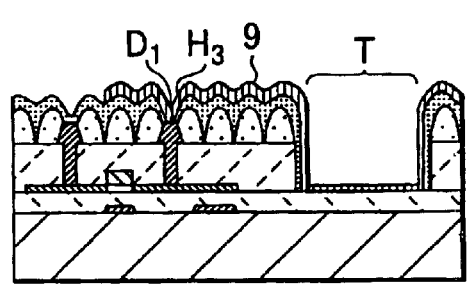
Figure 12I:
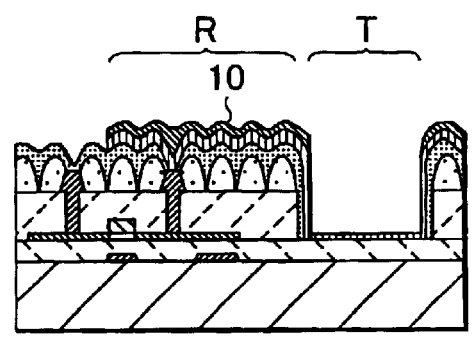
Figure 12J:
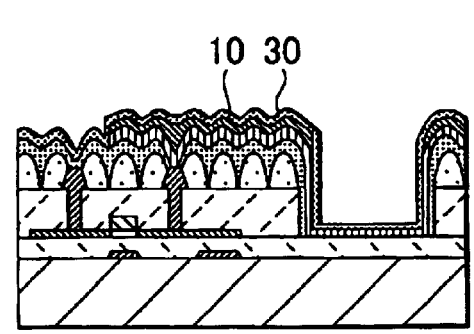
Figure 13:
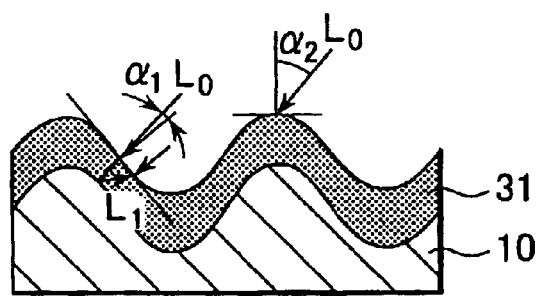
FIG. 13 is an explanatory view of a prior art operation of a reflection electrode and a coating film of a composition for an ultraviolet-reactive liquid crystal orientation film provided thereon.

In this case, a substrate has a reflection electrode 10 formed in the reflection part R of a pixel, and a transparent electrode made of a transparent conductive film 9 formed in the transmission part T (FIG. 12I). As shown in FIG. 2A, a protective film 12 made of a material transparent to a visible light for absorbing an ultraviolet light is formed on the substrate so as to eliminate the level difference in the surface roughness of the reflection electrode 10. A coating film 31 made of a composition for an ultraviolet-reactive liquid crystal orientation film (FIG. 2B) is then formed. A polarizing ultraviolet light L is irradiated onto the coating film 31 to form a liquid crystal orientation film 32 (FIG. 2C).

The present invention can be applied not only to the semi-transmission liquid crystal display device having a reflection electrode in the reflection part R of the pixel and a transparent electrode in the transmission part T of the pixel, but also to a reflection type liquid crystal display device formed with only a reflection electrode as a pixel electrode.

Figure 3:
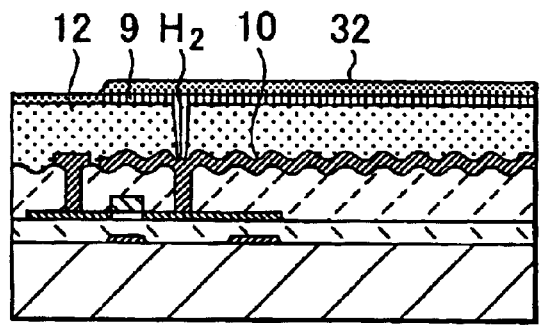
FIG. 3 is a cross-sectional view of a TFT substrate obtained from the producing method of the present invention.

In this case, the method for forming the reflection electrode 10 of the reflection type liquid crystal display device can be performed in accordance with the method for forming the reflection electrode 10 in steps (A) to (E) in the method for producing a semi-transmission liquid crystal display device shown in FIGS. 1A to 1I. As shown in FIG. 3, a protective film 12 is formed on a reflection electrode 10 so as to eliminate the surface roughness of the reflection electrode 10. Then, a TFT substrate having an ultraviolet-reactive liquid crystal orientation film 32 can be produced on the protective film 12.

Figure 4:
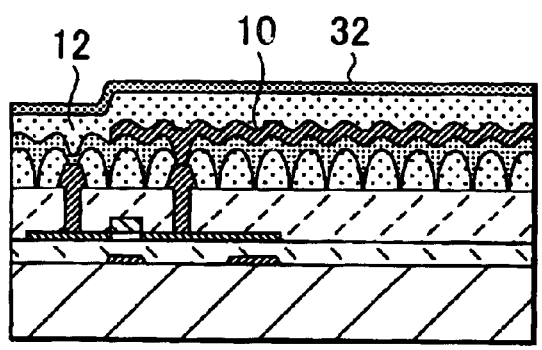
FIG. 4 is a cross-sectional view of a TFT substrate obtained from the producing method of the present invention.

The method for forming the reflection electrode 10 of the reflection type liquid crystal display device may be a method in which an insulating layer under the reflection electrode 10 includes a three-layer lamination construction (the interlayer insulating film 5, the first layer 7 and the second layer 8 made of a photoresist material), as shown in FIGS. 12A to 12J. In this case, as shown in FIG. 4, a protective film 12 is formed on a reflection electrode 10 so as to produce a TFT substrate having an ultraviolet-reactive liquid crystal orientation film 32 on the protective film 12.

The present invention is described above with reference to the drawings. The present invention can employ various embodiments. The drawings each show a liquid crystal display device having a TFT of a bottom gate construction in the pixel structure. The present invention can be also applied to a liquid crystal display device having a TFT of a top gate construction in the pixel structure. The present invention can be applied not only to an active matrix type liquid crystal display device but also to a passive type liquid crystal display device.

What is claimed is:

1. A method for producing a liquid crystal display device having a reflection electrode of a reflection diffuser panel shape formed with surface roughness provided on a driving substrate and an ultraviolet-reactive liquid crystal orientation film formed on a reflection electrode, comprising;

(1) forming a protective film made of a material transparent to a visible light for absorbing an ultraviolet light on the reflection electrode on the driving substrate side so as to eliminate the level difference in the surface roughness of the reflection electrode;

(2) coating a composition for an ultraviolet-reactive liquid crystal orientation film onto the protective film; and (3) forming a liquid crystal orientation film on the coating film of the composition for a liquid crystal orientation film by irradiating a polarizing ultraviolet light onto the substrate surface in the slanting direction.

2. The producing method according to claim 1, wherein in step (3), an irradiation angle θ of the ultraviolet light is 40°≦θ<90° to the substrate surface.

3. The producing method according to claim 1 or 2, wherein after forming the protective film in step (1) and before coating the composition for a liquid crystal orientation film in step (2), a transparent conductive film is formed on the protective film so as to cover the reflection electrode and to be electrically conductive with the reflection electrode, and the composition for a liquid crystal orientation film in step (2) is coating onto the transparent conductive film.

4. The producing method according to claim 1, wherein a reflection electrode is formed on a driving substrate as a pixel electrode in a reflection part of a pixel, and a transparent electrode made of a transparent conductive film is formed as a pixel electrode in a transmission part of the pixel, thereby producing a liquid crystal display device for performing semi-transmission liquid crystal display.

5. The producing method according to claim 1, wherein only a reflection electrode is formed on a driving substrate as a pixel electrode, thereby producing a liquid crystal display device for performing reflection type liquid crystal display.

6. A liquid crystal display device having a reflection electrode of a reflection diffuser panel shape formed with surface roughness provided on a driving substrate and an ultraviolet-reactive liquid crystal orientation film formed on the reflection electrode, wherein a protective film made of a material transparent to a visible light for absorbing an ultraviolet light is formed so as to eliminate the level difference in the surface roughness of the reflection electrode, and the ultraviolet-reactive liquid crystal orientation film is formed on the protective film.

7. The liquid crystal display device according to claim 6, wherein the reflection electrode is formed on the driving substrate in a reflection part of a pixel, and a transparent electrode made of a transparent conductive film is formed in a transmission part of the pixel.

8. The liquid crystal display device according to claim 6, wherein the reflection electrode is formed on the driving substrate as a pixel electrode and the driving substrate does not include a transparent electrode formed in a transmission part of the pixel.

9. The producing method according to claim 1, wherein irradiating during the forming a liquid crystal orientation film step comprises irradiating the substrate while in a first position and irradiating the substrate while in a second position offset from said first position.

10. The producing method according to claim 9, wherein the second position is offset from the first position by an angle of between about 40° and about 90°.

11. A method for producing a liquid crystal display device having a reflection electrode in a reflecting part of a pixel, comprising:

forming a gate insulating film on a substrate;

forming an interlayer insulating film on the gate insulating film;

etching the interlayer insulating film to form a surface of the interlayer insulating film with a predetermined roughness and a contact hole, wherein the roughness of the surface and location of the contact hole depend on a shape of a photoresist mask and an amount of exposure time used during the etching;

forming a reflection electrode on the interlayer insulating film, wherein the reflection electrode has a surface roughness that depends on the roughness of the interlayer insulating film and wherein the reflection electrode has a reflectivity that depends on the roughness of its surface;

forming a protective film made of a material transparent to a visible light for absorbing an ultraviolet light on the reflection electrode on the substrate side, wherein the level difference in the surface roughness of the reflection electrode is eliminated;

coating a composition for an ultraviolet-reactive liquid crystal orientation film onto the protective film; and forming a liquid crystal orientation film on the coating film of the composition for a liquid crystal orientation film by irradiating a polarizing ultraviolet light onto the substrate surface in the slanting direction.

12. The producing method according to claim 11, wherein a transmission electrode is formed in a transmission part of the pixel through the etching step, the forming a protective film step, the coating a composition step, and the forming a liquid crystal orientation film step.

13. The producing method according to claim 11, wherein there is no transmission electrode formed through the etching step, the forming a protective film step, the coating a composition step, and the forming a liquid crystal orientation film step.

14. The producing method according to claim 11, wherein at least two contact holes are formed during the etching step and at least two electrodes, a drain electrode and a source electrode, are created during the forming of the reflection electrode.

* * * * *